Patented May 7, 1946

2,400,036

UNITED STATES PATENT OFFICE 2,400,036

BONDED ABRASIVES

Charles E. Wooddell, Garret Van Nimwegen, and Edward T. Hager, Niagara Falls, N. Y., assignors to The Carborundum Company, Niagara Falls, N. Y., a corporation of Delaware No Drawing. Application April 15, 1944,
Serial No. 531,280

6 Claims. (Cl. 51—298)

This invention relates to new and improved abrasive articles and to the making of the same. More particularly, the invention relates to abrasive articles characterized in the art as elastic bonded abrasives, of which rubber-bonded abrasives are an example.

This application is a continuation-in-part of application Serial No. 438,814, filed April 13, 1942.

While rubber-bonded abrasive articles have many desirable properties and can be manufactured in comparatively short periods of time, it is difficult to obtain natural rubber of consistent quality from time to time. Natural rubber is obtained from many species of plants such as *Hevea brasiliensis, Castilla elastica,* Manihot, the guayule species, etc. Commercial rubber obtained from such different species by various methods is a somewhat indefinite mixture of resins, rubber hydrocarbon and proteins. The general formula for the rubber hydrocarbon is $(C_5H_8)_n$, where $n$ represents the degree of polymerization. The properties of commercial rubber vary with the source of the rubber latex, with the methods used to coagulate the latex, and with the methods used to remove undesirable resins and proteins from the rubber mass.

A great deal of research has been undertaken with the object of using a synthetic polymerization product which might be vulcanizable and have the desirable properties of natural vulcanized rubber and fewer of its disadvantages in the making of bonded abrasive wheels. It has been suggested for example that a synthetic polymer known briefly as "chloroprene" should be used in the manufacture of abrasive articles. "Chloroprene" or 2-chlorobutadiene can be readily polymerized. By interrupting the process of polymerization before completion, an alpha polymer of chloroprene is obtained which is soft, plastic and soluble in benzene. The product resembles unvulcanized rubber in its physical properties and mechanical behavior. At 130° C. the alpha polymer changes into an elastic polymer in a few minutes. Catalysts such as zinc oxide accelerate this change to the elastic chloroprene. Sulphur is not necessary to bring about this change. By suitably compounding and curing chloroprene, vulcanizates can be obtained with tensile strengths of over 3000 pounds per square inch. Elongations at the breaking point are obtained of the order of 700 to 900 per cent. Efforts have been made to obtain a vulcanizate similar to hard rubber. This does not appear to be possible by the polymerization of chloroprene. These properties of polymerized chloroprene greatly limit its usefulness as a bond for abrasive articles. With elongations of the order of magnitude of 700 to 900 per cent, abrasive grain cannot be held securely enough by a chloroprene bond to make grinding wheels for processing hard materials.

In accordance with the present invention we use as a bond for abrasive articles a synthetic polymerization product which is vulcanizable to a state or condition similar to that of a vulcanized hard rubber or ebonite. Such vulcanizable polymerization products are obtained by co-polymerizing butadiene, or one of its homologs or analogs, in admixture with one or more secondary monomers that will co-polymerize therewith, the secondary polymerizing component functioning as a hardening monomer whereby the final polymerized, hard vulcanized bond is obtained. The bond of the present invention is the vulcanized polymeriaztion product obtained after blending or compounding of the previously polymerized co-polymer with the necessary vulcanizers, accelerators, fillers, activators, etc., and vulcanization therewith, the co-polymer being a polymerized product comprising (1) One or more monomers of the butadiene type, and (2) One or more secondary monomers of a hardening type.

Monomers of butadiene, its homologs and analogs, are characterized by the presence within the monomer of two unsaturated bonds in conjugated position. The existence of the two points of unsaturation makes it possible to more readily produce a polymerized form of the substance with itself and other monomers, and at the same time leave sufficient remaining points of unsaturation to permit vulcanization and provide a source of cross-linkage and interaction with the various other constituents of the mixture, thereby obtaining an ultimate bond of high strength, hardness and durability.

For example, butadiene monomer has the formula $CH_2\!=\!CH\!-\!CH\!=\!CH_2$, in which there are two double bonds, one between the first and second carbon atoms of the chain and the second double bond between the third and fourth carbon atoms of the chain. These double bonds are points of unsaturation, in other words, they are points in the molecule where other butadiene molecules or other chemical molecules may attach themselves or interact with the butadiene molecules to form a more complex, but modified substance. The above monomeric butadiene is considered for purposes of the polymerization reaction to take the formula form as follows;

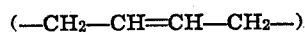

which, as can be seen provides two free available valences, one at each end of the monomer. Large numbers of these monomer molecules in the polymerizing reaction unite end to end through these free terminal valences to provide a long chain polymer of great length. However, from examination of the molecule structure above it is apparent that there still remains within the polymerized substance double bonds, or points of unsaturation, at which the polymer can link itself to other modifying constituents or by means of vulcanization agents form cross-linkages to form hard vulcanizates. Monomers of the butadiene type, i. e., homologs and analogs of butadiene, which can be used, include butadiene, isoprene, chloroprene, dimethyl butadiene, divinyl ether and vinyl acetylene.

The copolymerizing material for use in conjunction with the butadiene type monomer is one which is compatible with the butadiene or other diolefinic constituent and will copolymerize therewith to provide a co-polymer which will vulcanize to the hard state, for which reason we refer to the secondary part of the co-polymer as a hardening monomer. Such materials have at least one, and sometimes more than one, unsaturated bond, in the monomeric form. Acrylic nitrile monomer has been found to be highly satisfactory for copolymerizing with butadiene to obtain a butadiene-acrylic nitrile polymerization product which is vulcanizable to a hard, rigid condition of the character essential to make a good abrasive bond. Other hardening monomers which can be used include styrene, binylidene chloride, acrylic and methacrylic acid esters, halogen-substituted acrylic and methacrylic esters, halogen-substituted olefinic compounds containing a

linkage such as vinyl or allyl chloride.

It is sometimes found desirable to slightly modify the hardness characteristics of the vulcanized polymerization products obtained. This is done by the copolymerization therewith of a third monomer which will soften or plasticize the final product to render it to some degree more flexible or elastic. Monomeric substances satisfactory for this purpose include vinyl acetate, vinyl chloride, methyl acrylic ester, propene, butene and isobutene. The properties of the vulcanizable co-polymers may also be modified by admixing other polymeric compounds, one example of a satisfactory polymerization product so modified being butadiene-acrylic nitrile co-polymer blended with 10 to 70 percent of a vinyl chloride polymer.

By means of emulsion polymerization of butadiene and the copolymerizing material an interpolymer can be obtained in the viscous form. For example, co-polymers of butadiene and styrene or acrylic nitrile can be so made in proportions ranging from 60 to 75% of butadiene to 40-25% by weight of the styrene or acrylic nitrile. The viscous form so obtained may be further treated to give the sheet form.

As a further example, co-polymers of butadiene and vinylidene chloride can be made in proportions ranging from about 50 to 65% of butadiene to about 50-35% by weight of the vinylidene chloride.

If the co-polymer is used in sheet form it should be plasticized by milling and by the addition of softeners or plasticizers. The desired softener may be the ester type such as dibutoxyethylphthalate, dibutylphthalate or tricresylphosphate. It may also be one of the soft coal tars, coal tar products or cumar resins. A combination of these different softeners is often advisable.

After the synthetic co-polymer has been obtained in the form of an emulsion or masticated to a plastic mass, it is mixed with sulphur or an equivalent vulcanizing agent, a filler (or reinforcer) such as hard rubber dust, or reinforcing clays, vulcanizing accelerators, antioxidants or other activating or protective ingredients which may be required. This bonding mixture is then admixed with abrasive particles in the desired proportions. The abrasive mix is made by any suitable means at a temperature sufficiently low to retard further polymerization and is then transferred to molds. The molded articles can be cured at temperatures of about 340° F. in 90–120 minutes.

The following is a typical abrasive mix in which a butadiene-acrylic nitrile polymerization product, when vulcanized, constitutes the bond for the abrasive granules. The procedure for its use is given in detail.

| | Parts by weight |
|---|---|
| Butadiene-acrylic nitrile co-polymer | 100.0 |
| Dibutoxyethylphthalate | 50.0 |
| Phenolic resin | 12.0 |
| Sulphur | 40.0 |
| Benzothiazyl disulphide | 1.0 |
| Zinc oxide | 5.0 |
| Cryolite | 300.0 |
| Abrasive grain | 1230.0 |

The bond is prepared before any abrasive grain is incorporated in the mix. The mixing operation is carried out on a pair of ordinary rubber rolls. The butadiene-acrylic nitrile co-polymer is passed through the cool rolls three or four times and then allowed to run around the front roll during the breaking down period. The accelerator is added with cutting and blending. The softener and phenolic resin, followed by the zinc oxide and filler, are incorporated slowly with further working of the mix. The sulphur is the last ingredient added and is introduced without cutting. After thorough mixing the batch is cut each way several times before removing it from the rolls.

The rolls are made slightly warm and the bond mixture is passed through the rolls to make it more plastic before the addition of abrasive. The abrasive is added to the mix in small amounts in the manner employed in making natural rubber bonded abrasives. When all the abrasive has been added the abrasive-bond mixture is sheeted to the desired thickness and finally died out in the required shape before vulcanization. The wheels are cured two hours at 80 pounds steam and 500 pounds per square inch pressure in a mold and later finally vulcanized 16 hours at 300° F. in an oven.

An advantage of the invention is that synthetic polymerization products can be obtained according to specification as materials of more definite properties than commercial natural rubber which as noted earlier contains different percentages of resins and proteins, which are difficult to separate completely from the rubber hydrocarbon. Of extreme importance to the inventions is the fact that the polymerization products herein used are capable of vulcanization to various stages of resiliency and hardness, even to the substantially rigid condition of hard rubber or ebonite.

Generally speaking, the vulcanizates herein referred to are characterized by a higher thermal conductivity than natural rubber, especially good heat resistance and an ability to resist deterioration by numerous oils and hydrocarbons, which are often used in wet grinding operations.

A number of changes can be made in the manufacture of abrasive articles and in the choice of polymerization products and modifying ingredients from the specific example which has been described by way of example without departing from the invention which is defined within the compass of the following claims.

We claim:

1. A bonded abrasive article comprising abrasive particles and a co-polymer of butadiene with vinylidene chloride, said co-polymer being vulcanized to a substantially rigid condition.

2. A bonded abrasive article comprising abrasive particles and a co-polymer of a diolefinic monomer with a halogen-substituted olefinic compound, said co-polymer being vulcanized to a substantially rigid condition.

3. A bonded abrasive article comprising abrasive particles and a co-polymer of a butadiene homolog with vinylidene chloride, said co-polymer being vulcanized to a substantially rigid condition.

4. A bonded abrasive article comprising abrasive particles and a co-polymer of a diolefinic monomer with a halogen-substituted vinyl compound, said co-polymer being vulcanized to a substantially rigid condition.

5. A bonded abrasive article comprising abrasive particles and a binder therefor, said binder comprising butadiene copolymerized with 35–50% vinylidene chloride, said binder being vulcanized to a substantially rigid condition.

6. A bonded abrasive article comprising abrasive particles and a copolymer of butadiene with a halogen-substituted vinyl compound, said co-polymer being vulcanized to a substantially rigid condition.

CHARLES E. WOODDELL.
GARRET VAN NIMWEGEN.
EDWARD T. HAGER.